No. 782,210. PATENTED FEB. 7, 1905.
C. M. SESTER.
FRICTION WHEEL.
APPLICATION FILED SEPT. 14, 1903.

Witnesses:

Inventor:
Charles M. Sester.
By Chas. N. LaCarte,
Atty.

No. 782,210. Patented February 7, 1905.

UNITED STATES PATENT OFFICE.

CHARLES M. SESTER, OF PEORIA, ILLINOIS.

FRICTION-WHEEL.

SPECIFICATION forming part of Letters Patent No. 782,210, dated February 7, 1905.

Application filed September 14, 1903. Serial No. 173,086.

*To all whom it may concern:*

Be it known that I, CHARLES M. SESTER, a citizen of the United States, residing at Peoria, in the county of Peoria and State of Illinois, have invented certain new and useful Improvements in Friction-Wheels; and I do hereby declare that the following is a full, clear, and exact description of the invention, which will enable others skilled in the art to which it appertains to make and use the same.

This invention has reference to friction driving or driven gear-wheels and to the mode of yieldingly holding such gears in frictional contact with coöperating gear-wheels.

The object of the invention is to combine a face-wheel with a spider, the spider revolubly mounted on a shaft and the face-wheel mounted on the hub of the spider, and yielding engaging mechanism between the spider and gear, such mechanism adapted to be adjusted for fixing the gear with reference to its coacting gear and to regulate the pressure between such gear and spider.

The invention consists in certain peculiarities of construction and combination of parts, to be hereinafter described, with reference to the accompanying drawings, and subsequently claimed.

Figures 1, 2:
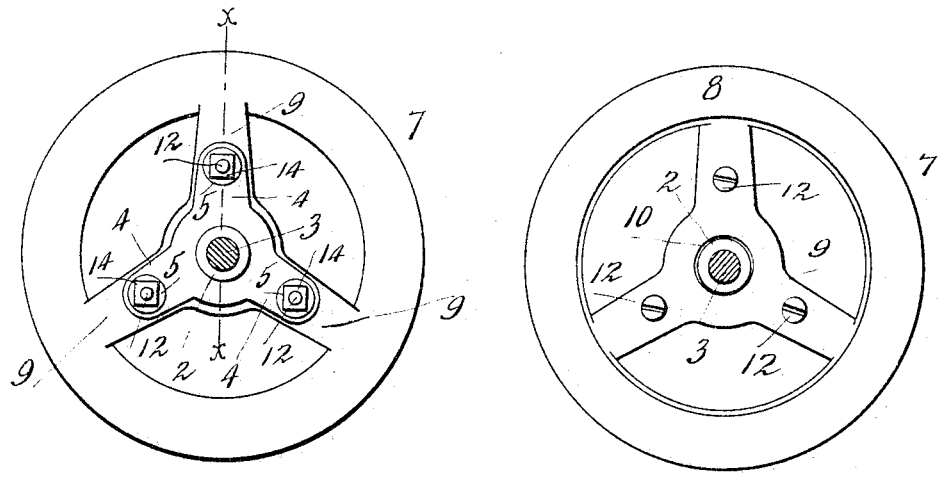
Figure 3:
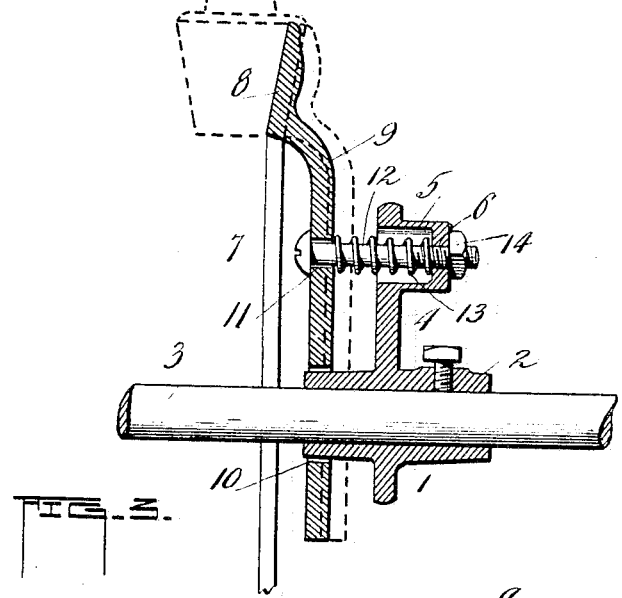

In the drawings, Figure 1 is a view of the gear-wheel from the rear and spider for supporting and driving such gear. Fig. 2 is a view of the wheel and its acting-face. Fig. 3 is a cross-section through a portion of the gear and spider, showing in detail the manner of driving the gear and the means for yieldingly holding the gear to its work.

The invention comprises a spider 1, having an elongated hub portion 2, and 3 a shaft on which the hub of the spider is fixed for rotation. From the hub 2 radiates the arms 4, terminating in the hollowed-out bodies 5, having the threaded openings 6.

7 denotes a gear-wheel having an acting bevel-face 8, and 9 represents conjoined spokes integral with the face 8, provided with the opening 10, adapted to be slidably adjustable on the hub 2 of the spider. The spokes 9 are each provided with openings 11, matching the openings 6 in the spider-arms 4.

To assemble the parts described, the spider is fixed to a suitable shaft. The wheel 7 is placed on the shaft with the hub portion 2 of the spider forming a bearing for the walls of the openings 10 of the wheel, and bolts 12 are passed through the openings 11 of each spoke of the wheel and their threaded ends screwed into the threaded openings 6 of the bodies 5 of the spider 1. However, previous to securing the bolts in the hollowed bodies 5 a coil-spring 13 is passed over the bolts and caused to bear against the inner faces of the hollowed-out bodies 5 and the rear face of the spokes 9 of the wheel. Screwing the bolts 12 into the spider-arms fixes the gear to the spider and insures the gear rotating with said spider and shaft, and the springs 13 provide for a yielding pressure between the gear and a coacting gear on a driven or driving shaft. (Not shown.) It is understood the heads of the bolts are slotted to permit the use of a screw-driver in adjusting the bolts. By such a structure I not only provide a novel drive between the spider and gear, but have provided also a convenient mode of applying the yielding pressure, and, further, to obtain a perfect adjustment of the gear 7, if the wheel-casting is imperfect and its acting-face is irregular, I can adjust either of the bolts 12 or all of them and insure its perfect contact and running therewith, and to lock the position of the gear relative to its spider after adjustment I have provided for securing nuts or taps 14 onto the ends of the bolts 12 adjacent to the outer faces of the hollowed-out bodies 5. (See Figs. 1 and 3.)

In Fig. 3 the gear 7 is shown in dotted lines coacting with a pinion also in dotted lines. It is intended by the dotted lines to show the gear 7 compressing the springs 13 and that the bolts 12 are not disturbed thereby, allowing a free and yielding movement of the gear toward and from the spider 1.

The uses to which the gear may be put are innumerable and may be found convenient as a drive or driven gear where it is preferable to employ a friction-gear.

The mode of supporting and driving the gear from its shaft and the adjustment secured by the bolts 12 insures a friction-wheel which may be constructed at small cost without the necessity of having to true its acting-face by polishing or otherwise and one which will be found durable.

Having thus fully described my invention, what I claim, and desire to secure by Letters Patent of the United States, is—

1. A gear, consisting of a member having radial arms supported by a hub, a wheel having an acting-face carried upon the hub of said member, adjustable connections between the wheel and arms of the member, and means for holding the wheel yieldingly away from said member.

2. A gear, consisting of a member adapted to be secured to a shaft, a wheel having an acting-face carried adjacent to said member, bolts for adjustably connecting the member and wheel, taps for locking the bolts after adjustment of the wheel and member, and springs for yieldingly holding the wheel from the member.

3. In a gear, the combination of a shaft, a member having an elongated hub secured to said shaft and provided with a series of radial arms, a wheel having an acting-face carried by the hub of said member, bolts passing through the gear and having screw connection with the arms of the member, and means for holding the wheel yieldingly away from said member.

4. In a gear, the combination of a member having a hub portion and a series of radial arms extending therefrom, said arms at their extremities provided with hollowed-out bodies, a wheel carried upon said hub portion, bolts passing through the wheel and having screw connection with the wall of the hollowed-out bodies, taps adapted to be screwed onto the ends of said bolts outside the hollowed-out bodies, and springs bearing around the bolts.

5. In a gear, the combination of a shaft, a wheel having an acting-face, a member having a hub portion adapted to be secured on said shaft and serving as a bearing for said wheel, radial arms from the hub provided with threaded openings, bolts forming a driving connection between the wheel and member having screw connection with the threaded openings in the radial arms, taps for the extreme outer ends of the bolts, and springs bearing around the bolts between the body of the wheel and the radial arms, substantially as specified.

In testimony whereof I affix my signature in presence of two witnesses.

CHARLES M. SESTER.

Witnesses:
CHAS. W. LA PORTE,
ROBERT N. MCCORMICK.